July 26, 1938.  N. BARNA  2,124,901

APPARATUS ADAPTED FOR THE PROPULSION OF FLUIDS

Filed Jan. 16, 1937

Inventor
NICOLAS BARNA
By
Young, Emery & Thompson
Attorneys

Patented July 26, 1938

2,124,901

UNITED STATES PATENT OFFICE 2,124,901

APPARATUS ADAPTED FOR THE PROPULSION OF FLUIDS

Nicolas Barna, Paris, France, assignor of one-half to Société les Fils de Emile Salmson, Paris, France, a corporation of France Application January 16, 1937, Serial No. 121,011
In France January 17, 1936

3 Claims. (Cl. 103—41)

This invention relates to improvements in apparatus adapted for the propulsion of fluids.

The invention is concerned with pumps which, in operation, effect or accelerate the displacement of a fluid in a piping and which, when at rest, still permit the outflow of the said fluid, such as the pumps which are more particularly used in hot water heating plants.

More particularly the invention consists in providing a pumping member in motion on the piping, said member comprising ports for the direct outflow of the fluid when at rest and valves adapted to close said ports when the said member exerts its pumping action.

Figure 1:
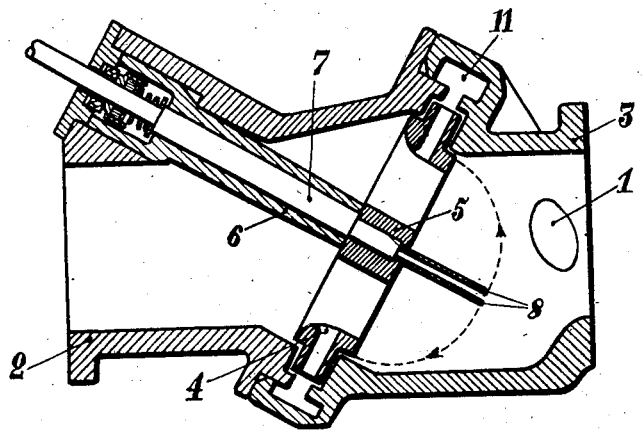

A particular form of construction of the invention applied to a centrifugal pumping member is shown by way of non limitative example in the accompanying drawing, in which Figure 1 is a sectional view of the whole machine at rest.

Figure 2:
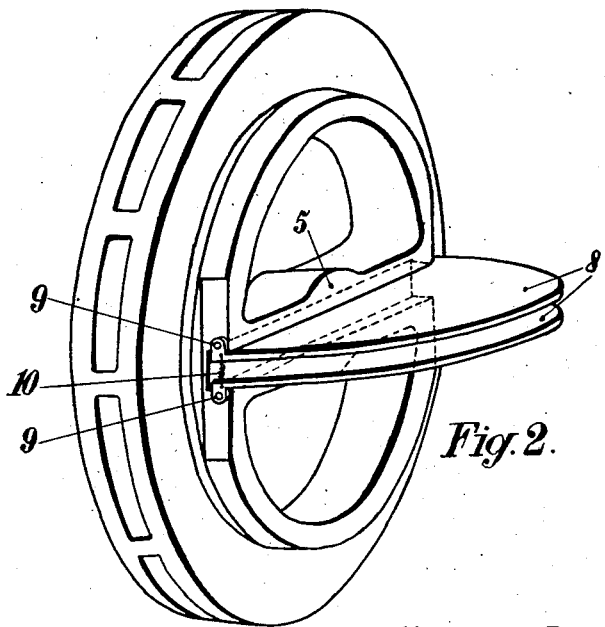

Figure 2 is a perspective view of the rotor.

Reference character 2 designates the part of the pump body which is connected to the suction side; 3 shows the part which is fixed to the delivery piping. I is the port through which the fluid which is pumped enters the part 3 of the pump body on the delivery side. 4 illustrates the vane wheel, 11 the scroll, 5 a rib of the wheel, 6 the bearing, 7 the shaft driving the vane wheel, and 8 the valves in their position when the machine is at rest.

Figure 2 shows the manner in which the vane wheel closing valves are arranged in order to act under the influence of centrifugal force. These closing valves are rotatably mounted about axes 9. A spring 10 maintains both valves 8 in the position shown when the machine is at rest and brings them to said position when the machine is stopped.

It is to be noted that the device does not require any special by-pass; the wheel directly draws fluid from the suction line 2 without any appreciable deviation and forces the fluid directly into the delivery pipe through the scroll 11 and the ports 1, the flap valves 8 then closing the cheeks of the wheel. The device can be directly inserted in a straight portion of the piping. At rest the fluid flows from 2 towards 3 with the minimum of resistance owing to the axial position of the device on the piping and to the large free section for the passage in the wheel.

In the example shown centrifugal force is used for closing in operation and springs 10 which are conveniently arranged are used for opening at rest. Under the action of centrifugal force the flap valves 8 have a tendency to bend the springs 10 and rest, while turning about the axes 9, on the delivery face of the wheel, thus closing the direct passage provided in the latter. So long as the machine rotates, the passage remains closed. At rest centrifugal force vanishes and the springs 10 cause both flap valves 8 to rotate in the opposite direction and open the passage. The seal of the flap valves 8 on the back face of the wheel is increased, during the operation, owing to the fact that the fluid pressure acts on said valves 8 in the direction for closing the passage provided in the wheel.

I claim:

1. In a tubular fluid piping, a rotatable pumping member, having a main fluid passage therethrough for pumping fluid from the inlet side to the delivery side of said member, said member having by-pass ports for the direct passage of the fluid axially through said member, and two rocking flap valves mounted on the delivery side of the pumping member, said valves being actuated by centrifugal force towards port-closing position, for automatically closing said direct-passage and maintaining the same closed as soon as the said member is set in motion, in order to permit its pumping action.

2. In a rectilinear tubular fluid piping, a rotatable pumping member having a main fluid passage therethrough for pumping fluid from the inlet side to the delivery side of said member and rotating about a sloping axis convergent with the axis of the piping, said member having by-pass ports for the direct passage of the fluid axially through said member and two flap valves mounted on the delivery side of the pumping member, said valves being actuated by centrifugal force towards port-closing position, for automatically closing said direct passage and maintaining the same closed as soon as the said member is set in motion, in order to permit its pumping action.

3. In a conduit for fluids, a pump comprising a rotor for impelling liquid radially and provided with a peripheral passage for the fluid pumped, a casing having an inlet and an outlet at opposite sides of said rotor respectively and having an annular passage cooperating with the peripheral passage in the rotor to receive the fluid pumped by the rotor, said annular passage discharging the pumped fluid at the outlet side of the rotor, said rotor having orifices formed about the axis thereof for the direct flow of the totality of the fluid axially through the rotor, closure means for said orifices mounted on transverse axes adjacent the axis of the rotor and adapted to be tightly closed by the combined action of centrifugal force and the discharge pressure of the pump upon rotation of the rotor, and resilient means urging said closures to an open position but permitting closing thereof under the action of rotation of the rotor.

NICOLAS BARNA.